United States Patent [19]

Bye et al.

[11] Patent Number: 4,818,154

[45] Date of Patent: Apr. 4, 1989

[54] END-EFFECTOR ASSEMBLY FOR COUNTERSINKING A PREDRILLED BORE

[75] Inventors: Jeffrey C. Bye, Everett; Mark F. Gabriel, Renton, both of Wash.

[73] Assignee: The Boeing Company, Seattle, Wash.

[21] Appl. No.: 72,866

[22] Filed: Jul. 14, 1987

[51] Int. Cl.$^4$ .............................................. B23B 39/00
[52] U.S. Cl. ...................................... 408/111; 33/833
[58] Field of Search ................. 408/111, 237, 81, 127; 33/169 C

[56] References Cited

U.S. PATENT DOCUMENTS

| | | | |
|---|---|---|---|
| 2,210,128 | 8/1940 | Rohr | 77/55 |
| 2,335,614 | 11/1943 | Spievak | 77/55 |
| 2,829,544 | 4/1958 | Bergstrom | 408/225 |
| 4,098,001 | 7/1978 | Watson | 33/169 |
| 4,155,169 | 5/1979 | Drake et al. | 33/169 |
| 4,242,017 | 12/1980 | DeFazio | 408/111 |
| 4,332,066 | 6/1982 | Hailey et al. | 29/26 R |
| 4,337,566 | 7/1982 | DiMatteo et al. | 29/558 |
| 4,337,579 | 7/1982 | DeFazio | 33/172 D |
| 4,338,052 | 7/1982 | Lockett | 409/206 |

Primary Examiner—Neil Abrams
Attorney, Agent, or Firm—Bruce A. Kaser

[57] ABSTRACT

An end-effector assembly provides lateral compliance for a cutting tool while counter-sinking a bore in a workpiece. The assembly has a first subassembly which is connected to a gantry. A second subassembly may extend or retract relative to the first, such movement being driven by hydraulic or air cylinders. A third subassembly carries the cutting tool and motor for driving the same. This latter subassembly is connected to the second subassembly by a plurality of compliant members which cause the third subassembly to extend and retract correspondingly with the second, but which permit the third subassembly to shift laterally relative to the second. In this situation, the motor and cutting tool also shift laterally along with the third subassembly.

6 Claims, 7 Drawing Sheets

END-EFFECTOR ASSEMBLY FOR COUNTERSINKING A PREDRILLED BORE

TECHNICAL FIELD

This invention relates to machines that are used to automatically drill bores in a workpiece, and more particularly, to robots that automatically drill bores for an assembly operation where a fastener extending through a drilled bore is used to connect one structural member to another.

BACKGROUND ART

The field of robotics has become sufficiently sophisticated so that it is now possible to use robotic drilling in aircraft assembly operations. A common assembly operation in this field of manufacture involves attachment of an exterior member to an underlying support structure or other member. Conventional metal fasteners are used to make this kind of attachment, with the fastener being installed in and extending through coaxial bores in the pieces to be connected.

Generally, it is desirable that the installed fastener's head be flush with the outside surface of the exterior member. This requires the bore in the outside surface to have a countersink for receiving the fastener's head. Robotic drilling has been useful as a means for automatically and quickly drilling straight bores, but has proven problematical when attempting to drill bores with a countersink all in a single drilling operation. As a practical matter, this is best done in two stages, with a straight bore first being drilled and a countersink later being made.

It is important the countersink be normalized relative to the exterior member's outside surface so that the fastener's head may be installed substantially flush therewith. The purpose of the present invention, therefore, is to provide an end-effector assembly, for use in connection with robotic countersink drilling, that carrier a motor and cutting tool for countersinking a bore, and which acts to place the cutting tool in normality relative to the outside surface of the exterior member.

DISCLOSURE OF THE INVENTION

An end-effector assembly constructed in accordance with the invention has three major subassemblies or portions. The first portion is used to mount the end-effector assembly to a supporting structure, such as a robotic gantry, for example. The second portion is slidably mounted to the first in a manner so that it may be extended or retracted relative to the first portion. Suitable cylinders are provided for actuating such movement. The third portion carries the cutting tool and the motor for driving the same. The third portion has a downwardly extending guide member which contacts the surface of the workpiece in which a countersink is to be made. Further, the third portion is connected to the second portion solely by a plurality of compliant members which cause the third portion to extend and retract correspondingly with the second portion as the cylinders are actuated, but which permit the third portion to shift laterally relative to the second portion when contact with the workpiece is made. This further causes the cutting tool and drive motor to laterally shift along with the third portion.

BRIEF DESCRIPTION OF THE DRAWING

In the drawings, like reference numerals and letters refer to like parts throughout the various views, and wherein.

BEST MODE FOR CARRYING OUT THE INVENTION

Figure 1:
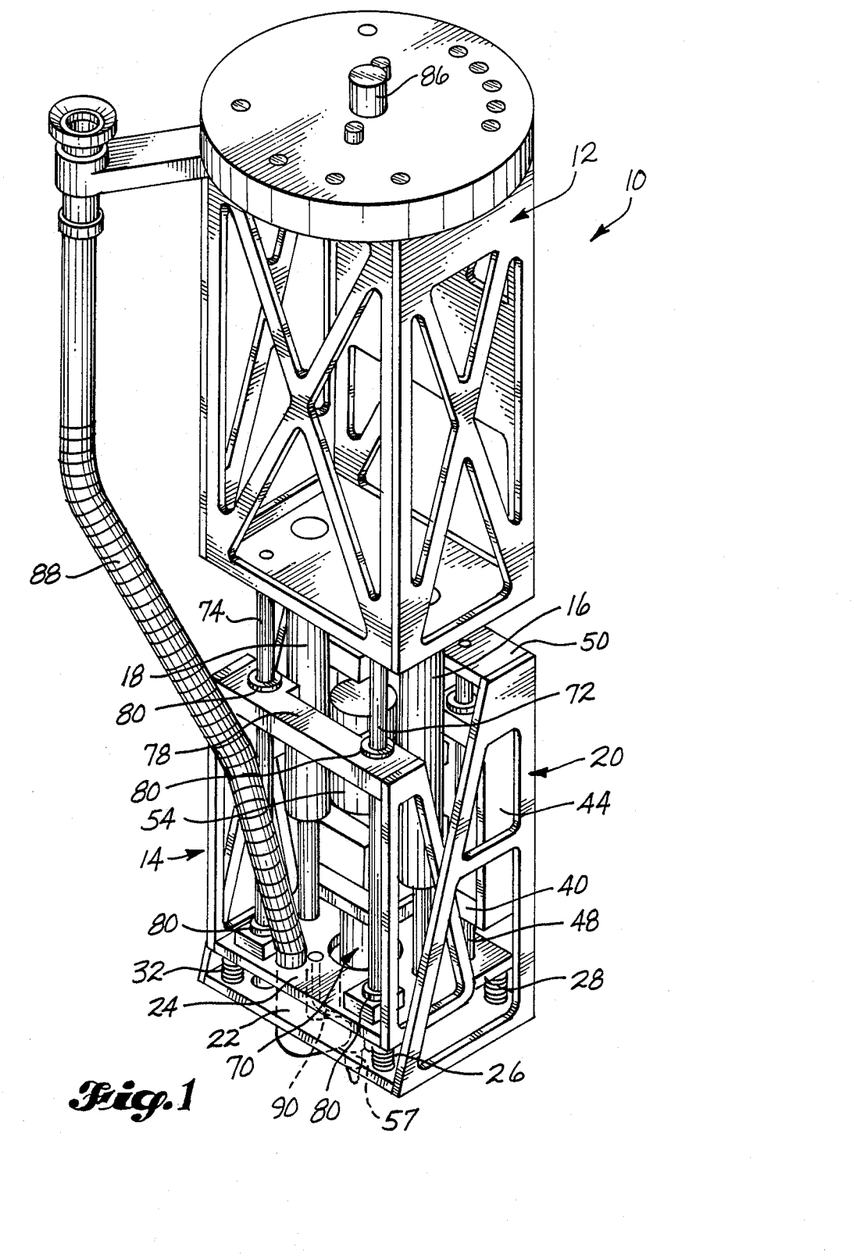
FIG. 1 is a pictorial view of an end-effector assembly constructed in accordance with a preferred embodiment of the invention.

Referring now to the drawings, and first to FIG. 1, therein is shown at 10 an end-effector assembly constructed in accordance with a preferred embodiment of the invention. The assembly 10 is made of three major subassemblies or portions. A first portion, or mounting cage 12, provides a means for mounting the assembly 10 to a robotic gantry or other supporting structure which is not shown in the drawings. A second portion, or tool extend cage 14, is positioned generally below the mounting cage 12 and is extendible and retractable relative to the mounting cage by a first set of cylinders 16, 18, which will be further described later. Also connected to the tool extend cage 14 is the third portion of the assembly 10, which is a motor feed cage 20.

Figure 6:
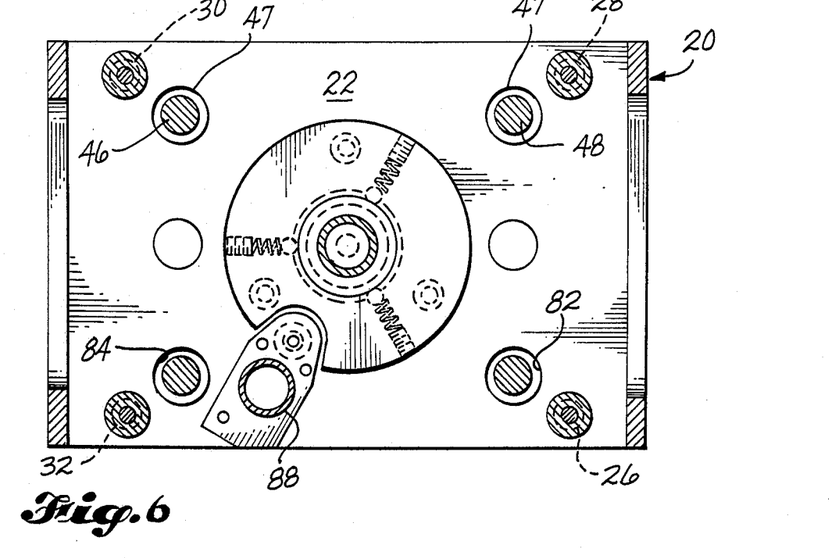
FIG. 6 is a top view of the bottom plate of a motor cage subassembly or third portion of the end-effector, and is taken along line 6—6 in FIG. 5.

The bottom part of the motor feed cage 20 consists of a horizontal plate 22, which is best seen in FIG. 6. This plate 22 is connected to a similar plate 24 in the bottom part of the tool extend cage 14. The plates 22, 24 are spaced from each other and interconnected by a plurality of compliant members 26, 28, 30, 32, perferably one member each being positioned near the corners of hte plates 22, 24.

Figure 10:
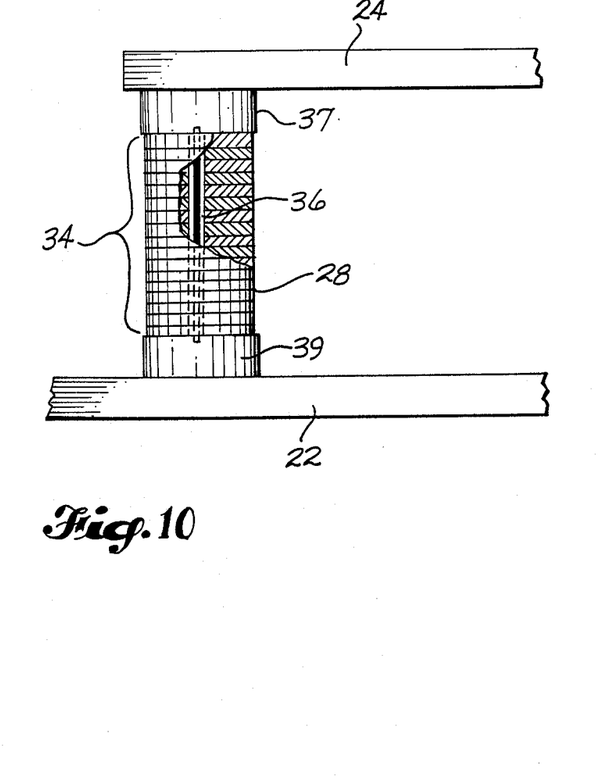
FIG. 10 is an enlarged side view, in partial section, of a compliant member which interconnects and spaces the plates shown in FIGS. 6 and 7.

The compliant members 26, 28, 32 are of a conventional nature and would be familiar to a person skilled in the art. By way of illustrative example only, each compliant member 26, 28, 30, 32 may be made of a plurality of stacked washers 34 (see FIG. 10), with each individual washer being covered by a thin layer of rubber or similar material. The washers 34 are held in juxtapositionally stacked position by a centrally located wire 36, or the like, which interconnects upper and lower plate fittings 37, 39. This prevents the washers 34 from being extended axially relative to each other, but permits them to shift a small amount laterally or transversely.

Figure 5:
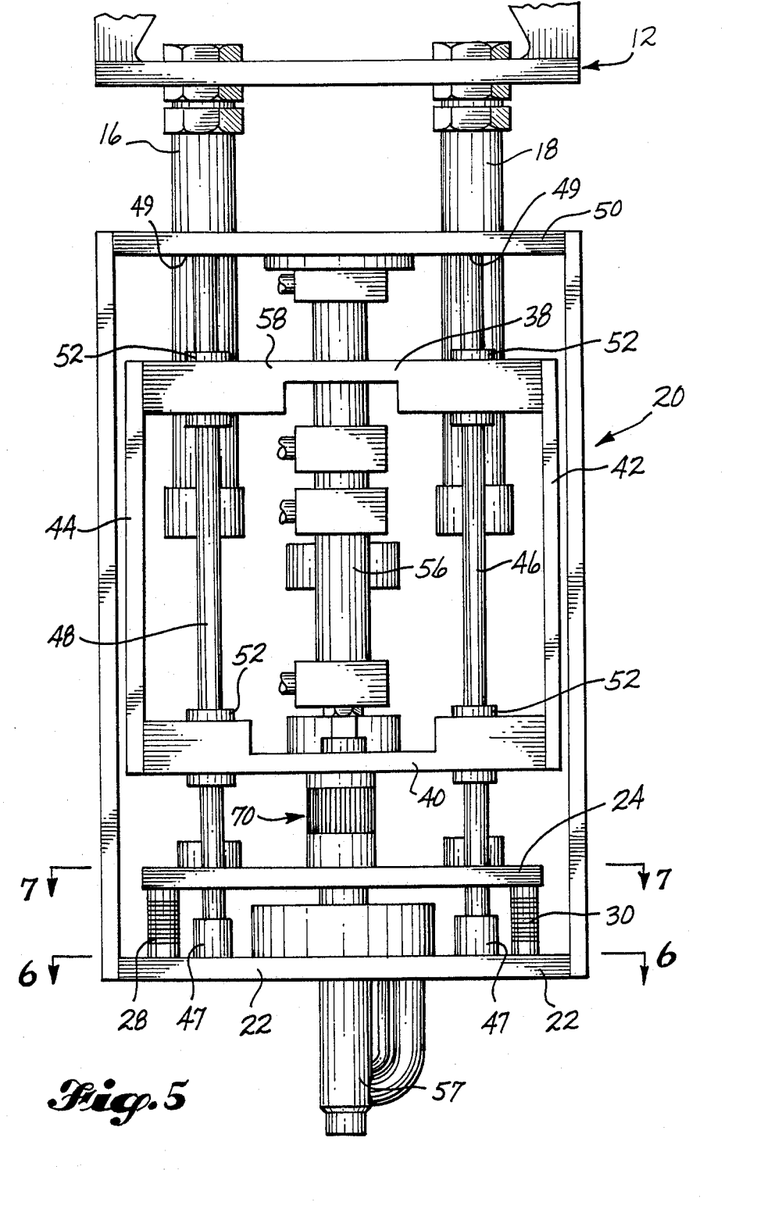
FIG. 5 is a rear view of the lower half of the end-effector assembly shown in FIG. 1.

Referring now to FIG. 5, the motor cage assembly 20 includes an inner, upper plate 38 and an inner, lower plate 40 which are connected together by two side bars 42, 44. Each of the upper and lower plates 38, 40 are slidable upwardly and downwardly on a pair of vertical motor feed shafts 46, 48. The shafts 46, 48 are fixedly connected at their lower and upper ends 47, 49, respectively, to the bottom plate 22 and to a top plate 50 of the motor feed cage. The lower ends 47 extend through spaces 51, 53 located in the bottom plate 24 of the tool extend cage 14 but are not in direct contact with the tool extend cage 14. Suitable bearings, indicated at 52 in FIG. 5, may be received within the upper and lower inner plates 38, 40 to facilitate their sliding on shafts 46, 48.

Figure 3:
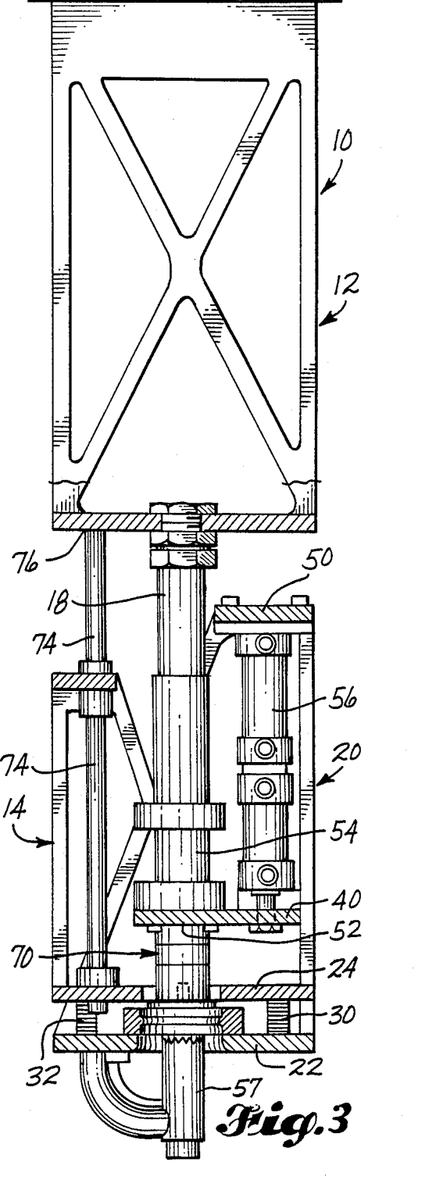
FIG. 3 is a view like FIG. 2 but shows in cross-section the lower part of the end-effector assembly.
Figure 4:
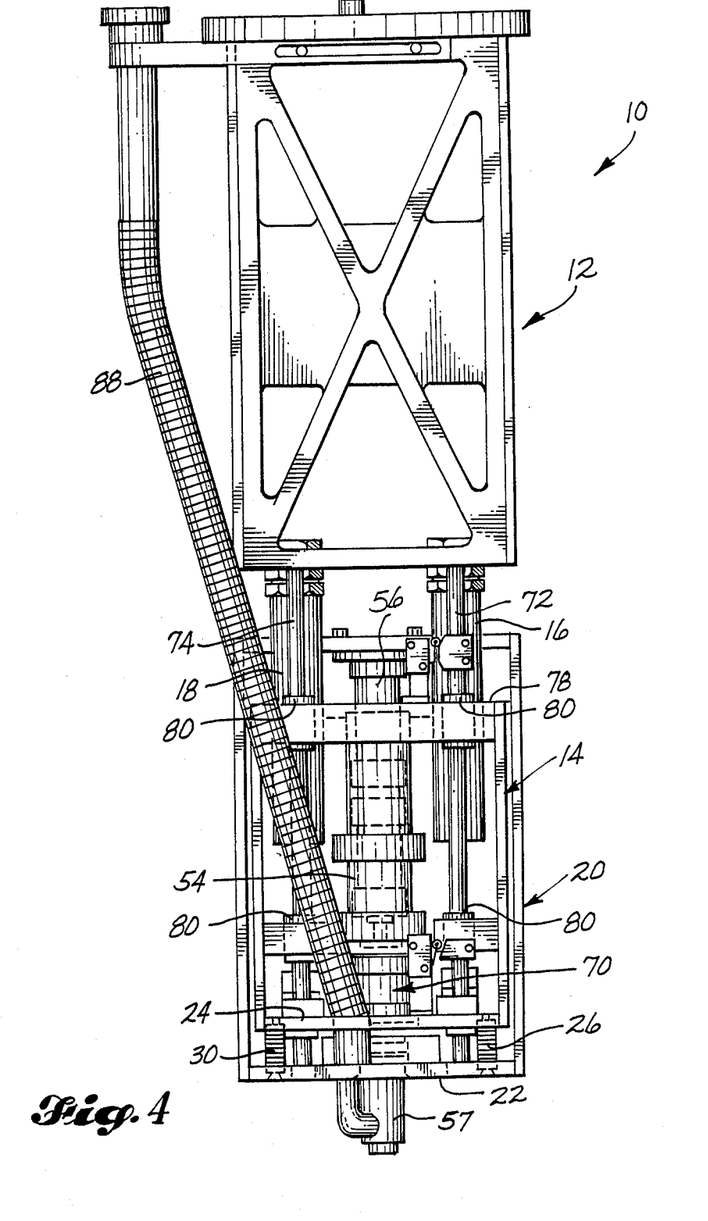
FIG. 4 is a frontal view of the end-effector assembly shown in FIG. 1.
Figure 7:
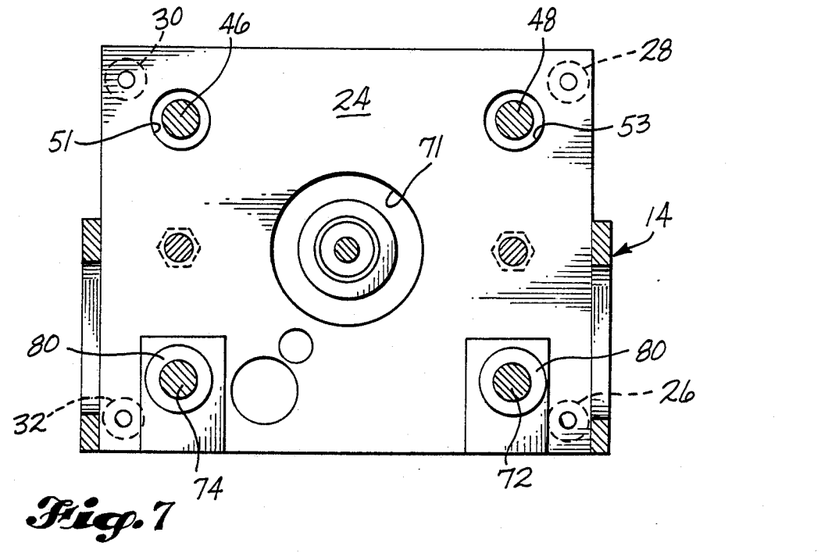
FIG. 7 is a view similar to FIG. 6 but shows the bottom plate of a tool extend subassembly or second portion of the end effector, and is taken along line 7—7 in FIG. 5.

Directing attention now to FIG. 3, the lower inner plate 40 has an inwardly extending portion 52 to which a motor 54 is mounted. Drivingly interconnecting the lower inner plate 40 and the upper plate 50 of the motor cage 20 is still another cylinder or motor drive cylinder 56. A notched portion 58 in the upper inner plate 38 permits the cylinder 56 to be substantially coplanar with side bars 42, 44. Extension or retraction of the cylinder 56 causes the upper and lower inner plates 38, 40 to slide either downwardly or upwardly on shafts 46, 48. This in turn moves the motor 54 downwardly or upwardly for drilling a countersink in a bore. The motor 54 is linked to a suitable cutting tool 58 by a compliancy drive mechanism which extends through a space or opening 71 (see FIG. 7) in the bottom plate 24 of the tool extend cage 14. Further description of this will be provided later.

Figure 8:
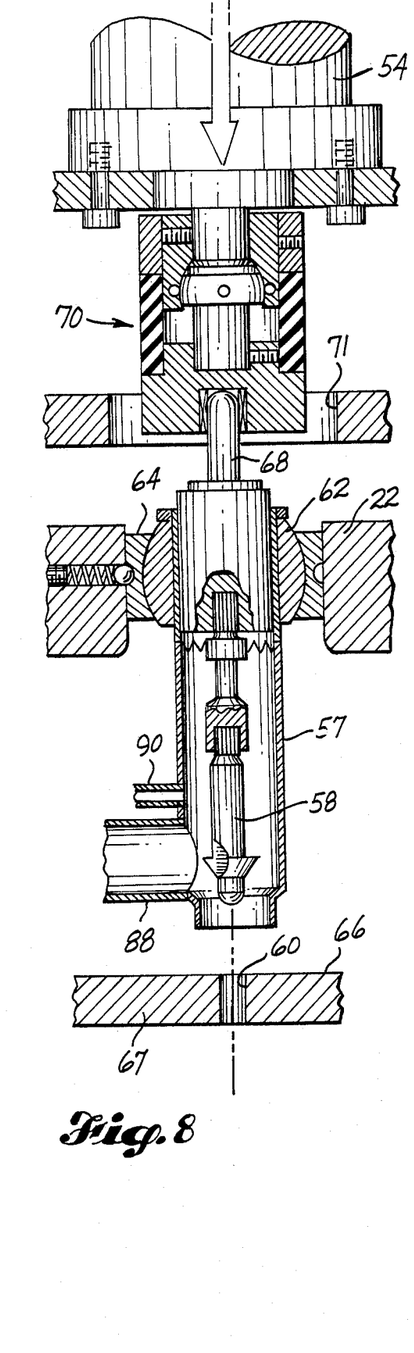
FIG. 8 is an enlarged, fragmentary cross-sectional view of a compliancy drive mechanism that interconnects an assembly drive motor with a cutting tool.
Figure 9:
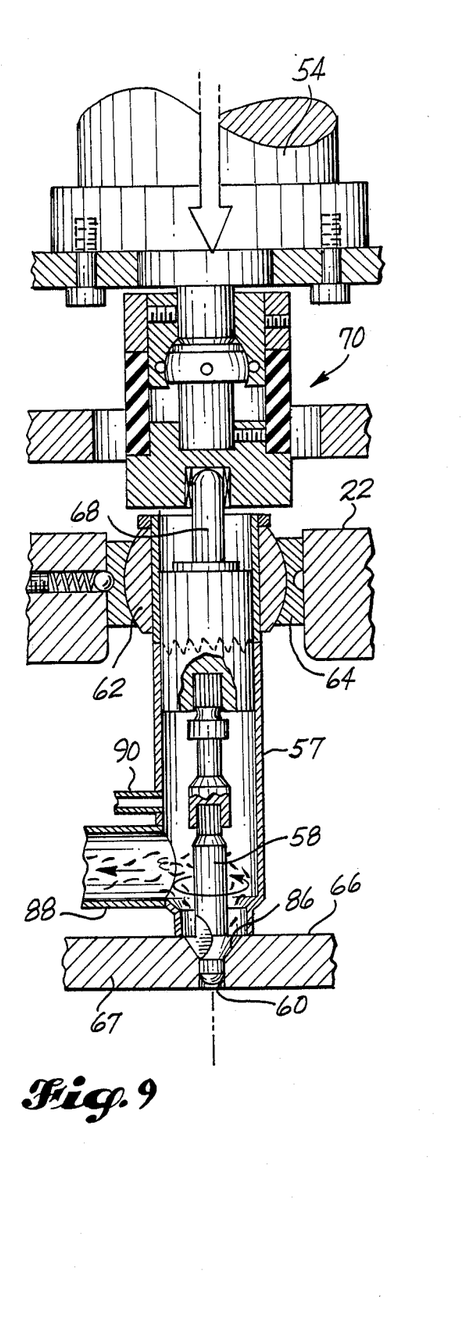
FIG. 9 is a view like FIG. 8, but shows downward movement of the cutting tool for countersinking a bore.

A cutter housing 57 is connected to the bottom plate 22 of the motor cage 20. This housing 57 provides a means for guilding a cutter or cutting tool 58 (see FIGS. 8 and 9) downwardly to a predrilled bore 60 which is to be countersunk. The housing 57 is mounted to the motor cage's lower plate 22 by means of a spherical ball-and-socket connection 60, 62. This permits the housing 57 to pivot a certain amount which allows the housing 57 to adjust to the contour of the outer surface 66 of the member 67 in which the bore 60 is located. An upper end 68 of the cutter or cutting tool 58 is drivingly connected to the motor 54 by a connecting device, indicated generally at 70, which functions as a universal joint. The ball-and-socket 62, 64 and the universal joint device 70 function as an angular compliancy drive mechanism which interconnects the cutter 58 to the drive motor 54. This mechanism, however, is the subject of a related patent application (U.S. application Ser. No. 07/074,134, filed July 16, 1987) which obviates the need for further description herein.

Figure 2:
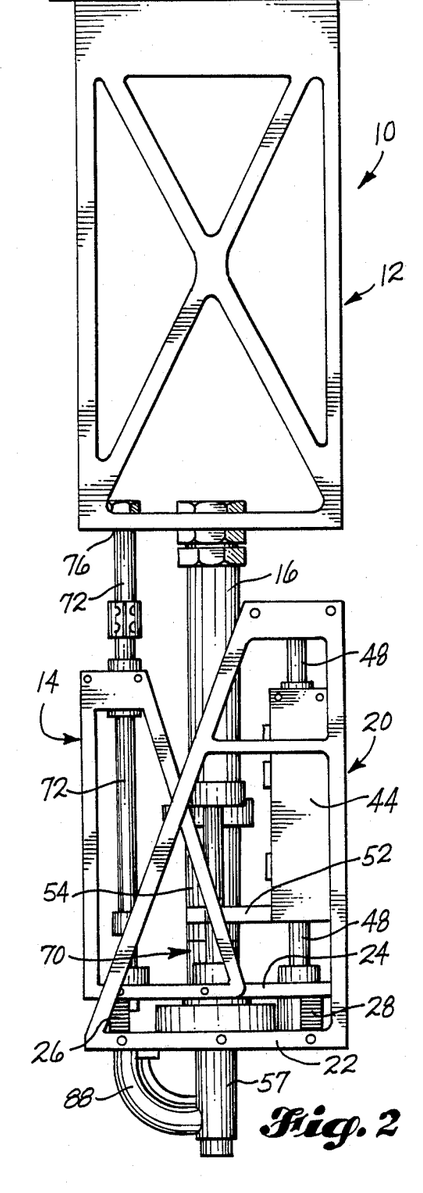
FIG. 2 is a right-hand side view of the end-effector assembly shown in FIG. 1.

Directing attention to FIGS. 1-3, the tool extend cage 14 is slidably connected to the mounting cage 12 by a pair of vertical shafts 72, 74 located on one side of the assembly. The shafts 72, 74 are fixedly connected at their upper ends 76 to the mounting cage and extend through both an upper plate 78 of the tool extend cage, and its previously described lower plate 24. Bearings 80 in plates 78, 24 permit the tool extend cage 14 to slide downwardly and upwardly on the shafts 72, 74. Actuation of the centrally located first set of cylinders 16, 18, which may be either air or hydraulic, causes such extension and retraction. When the tool-extend cage 14 is fully retracted upwardly the motor feed cage is also fully retracted upwardly and the shafts 72, 74 may, in this position, extend downwardly through and below openings 82, 84 in the motor cage's bottom plate 22.

Thus having generally described and basic details of the end-effector assembly 10, a description of the general operation of the same will now be provided.

The assembly 10 would be mounted by a quick-connect device 86 at the top of the mounting cage to a robot or robotic gantry. In this position, the cylinders 16, 18 would be retracted, thereby pulling the tool-extend cage 14 and motor feed cage 20 upwardly. Teh robotic gantry would then move the assembly over a predrilled bore, like bore 60 shown in FIGS. 8 and 9. At this point, the cage-extend cylinders 16, 18 would be actuated which would further extend the tool-extend and motor feed cages 14, 20 downwardly until the cutter housing 57 is operatively placed relative to the bore 60. At this happens, the compliant members 26, 28, 30, 32 would permit the motor feed cage 20 to shift laterally relative to the tool extend cage 14, for permitting compliancy of the drill motor 54 and cutting tool relative to the bore 60. As mentioned above, the compliancy drive mechanism 70 extends through an opening 71 in the lower plate 24 of the tool-extend cage 14. What this means is that the drive motor 54, and the cylinder 56 which feeds the motor and cutter upwardly or downwardly, are connected only to the motor feed cage 20 and will therefore shift laterally along with the cage 20. Upon completion of extension of cylinders 16, 18, motor feed cylinder 56 is then actuated which drives the motor and cutter 54, 58 downwardly a predetermined distance 86 for countersinking the bore 60. While the countersink is made, a vacuum tube 88 and a lubricant supply tube 90 deliver and remove, respectively, lubricant and chips to and from the cutter housing 57. After the countersink is drilled, the tool-extend cage 14 is retracted for a subsequent countersinking operation.

While an exemplery embodiment of the invention has been described above and shown in the accompanying drawings, it is to be understood that such embodiment is merely for illustrative purposes only. Obviously, certain changes could be made to the invention without departing from the spirit and scope thereof. It is intended, therefore, that the scope of the invention shall be limited only by interpreting the appended claim or claims which follow, in accordance with the well-established doctrines of patent claim interpretation.

What is claimed is:

1. An end-effector assembly for use in positioning a drive motor and cutting tool relative to a workpiece, so that said cutting tool may be used to countersink a pre-drilled bore in said workpiece, comprising:

a first cage subassembly mounted to a supporting structure;

a second cage subassembly normally positioned below said first cage subassembly;

first cylinder means operable for linearly extending and retracting said second cage subassembly in an axial direction relative to said first cage subassembly;

a third cage subassembly at least partially surrounding said second cage subassembly and having a generally horizontally mounting plate to which said drive motor and cutting tool are mounted, said plate being positioned below said second cage subassembly; and a plurality of compliant members interconnecting said third cage subassembly and said second cage subassembly, wherein each of said compliant members includes a plurality of washers juxtapositionally stacked in substantially the same direction as said axial direction, said washers being connected together in a manner so that said plurality of washers interconnects said second and third cage subassemblies, to cause said third cage subassembly to extend and retract correspondingly with said second cage subassembly in response to operation of said first cylinder means, and further, said plurality of washers being connected together in a manner so that said washers may shift laterally with respect to each other, to permit said third cage subassembly to shift laterally relative to said second cage subassembly.

2. The end-effector assembly in accordance with claim 1, including second cylinder means, carried exclusively by said third cage subassembly, and operable for extending and retracting said motor and said cutting tool relative to said third cage subassembly independently of operation of said first cylinder means.

3. The end-effector assembly of claim 1, including cutting tool guide means, connected to said third cage subassembly, and extending downwardly below said third cage subassembly, for guiding said cutting tool carried by said third cage subassembly to said predrilled bore.

4. The end-effector assembly of claim 1, wherein said second cage subassembly also includes a generally horizontally oriented plate spaced in parallel relationship above said horizontal mounting plate, said plates being interconnected by said complaint members.

5. The end-effector assembly of claim 4, wherein four compliant members interconnect said horizontal plates.

6. The end-effector assembly of claim 1, wherein four compliant members interconnect said third subassembly and said second subassembly.

* * * * *

UNITED STATES PATENT AND TRADEMARK OFFICE
CERTIFICATE OF CORRECTION

PATENT NO. : 4,818,154
DATED : April 4, 1989
INVENTOR(S) : Jeffrey C. Bye and Mark F. Gabriel It is certified that error appears in the above-identified patent and that said Letters Patent is hereby corrected as shown below:

Column 1, lines 41 and 42, "carrier" should be
-- carries --.

Column 2, line 57, "hte" should be -- the --, second occurrence.

Column 2, line 59, "26, 28, 32" should be -- 26, 28, 30, 32 --

Column 3, line 37, "guilding" should be -- guiding --.

Column 4, line 3, "and" should be -- the --.

Column 4, line 10, "Teh" should be -- The --.

Column 4, line 16, "At" should be -- As --.

Claim 4, column 6, line 13, "complaint" should be
-- compliant --.

Signed and Sealed this

Thirteenth Day of February, 1990

*Attest:*

JEFFREY M. SAMUELS

*Attesting Officer*   *Acting Commissioner of Patents and Trademarks*